3,355,836
FISHING LURE PROPULSION DEVICE
Roy R. Hanson, 155 Cumberland Ave.,
Maryland Heights, Mo. 63042
Filed Mar. 18, 1965, Ser. No. 440,730
4 Claims. (Cl. 43—19)

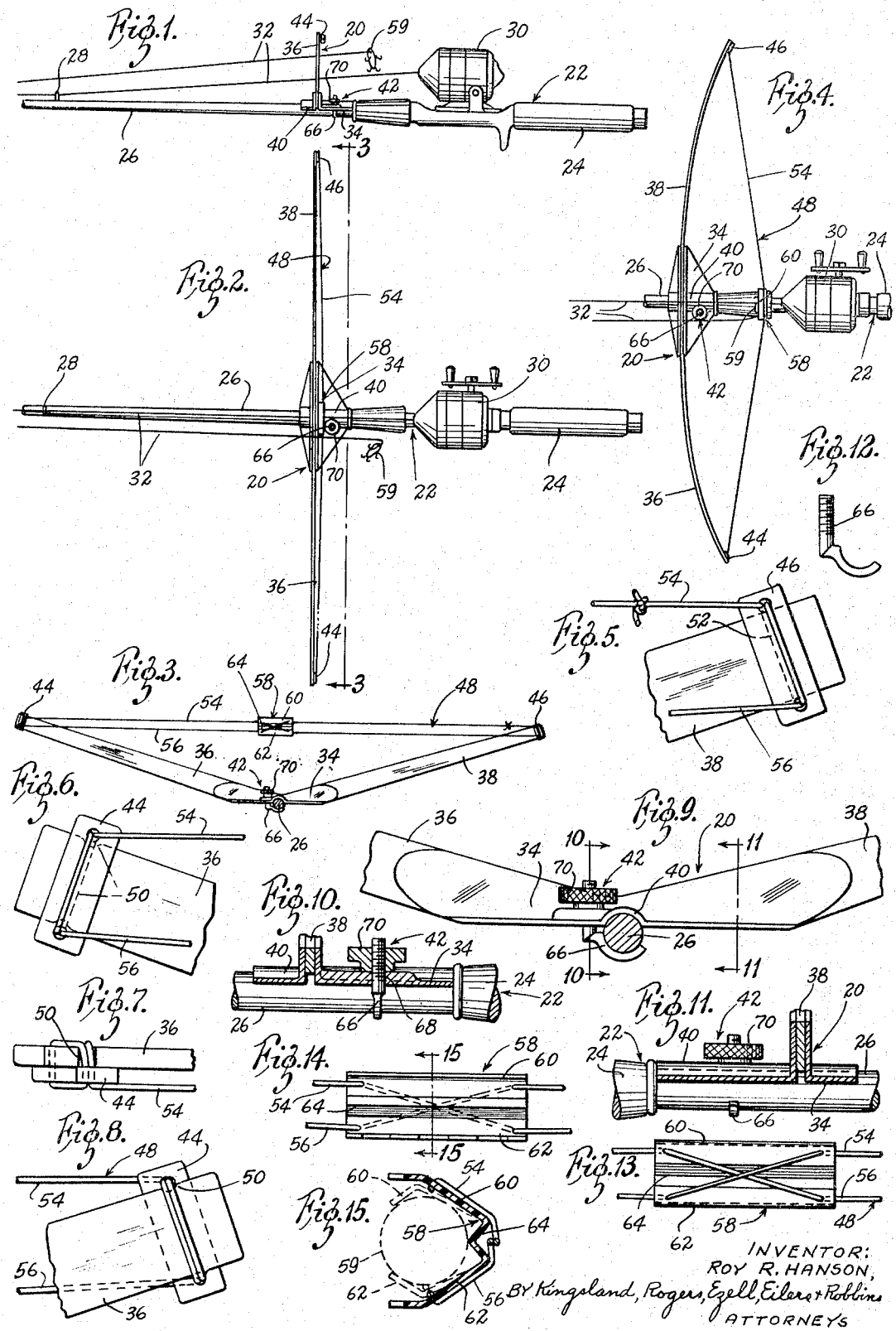
Dec. 5, 1967     R. R. HANSON     3,355,836
FISHING LURE PROPULSION DEVICE
Filed March 18, 1965
INVENTOR:
ROY R. HANSON,
BY Kingsland, Rogers, Ezell, Eilers & Robbins
ATTORNEYS

United States Patent Office 3,355,836
Patented Dec. 5, 1967

ABSTRACT OF THE DISCLOSURE

A bow device for use with conventional fishing rods provided with a spinning reel for propelling a fishing lure directly from the bow string. The bow is clamped directly to the shaft of the fishing rod and has upwardly diverging arms permitting the clearing of the lure through the arms in a flat trajectory to a desired restricted target area.

---

It is a particular feature of this invention that there has been provided a bow device that can be attached to a conventional fishing rod and used with a spinning reel to propel either an artificial lure or live bait into a selected area. After the lure has been propelled, the rod and reel can be employed to retrieve the lure or play any striking fish in conventional fashion. The bow attachment has particular significance in that it can be simply attached to the rod for use in guiding and propelling the lure to restricted target areas. As an example, in fishing along banks where there are overhanging limbs and the like, that may present only a small opening through which the lure is desired to be propelled, the bow device can be used to propel the lure in a relatively flat and straight trajectory, and, so to speak, thread the needle through the opening to the selected target area. Conventional fishing rods that are used in either overhead or side casting operations have a high arc-like trajectory so that it is quite difficult to cast the lure through a narrow or chute-like opening.

Accordingly, by means of this invention, the bow device, which has a pair of arms diverging upwardly from a base adapted to be mounted to the rod shaft, can be used with a lure grasping means situated on the medial portion of the bow string to grasp the lure. The grasping device is then brought backward to place the bow arms under tension and propel the fishing lure to the desired area. The bow device can be very simply attached in a matter of seconds, and, after the lure has been used and propelled, the fishing rod and reel are handled in conventional fashion to either reel in or play any fish that may be caught upon the lure.

As a further feature of this invention, the bow device can be relatively simply constructed and attached to the rod in a matter of seconds. It can be used by those unskilled in the art with only a minimal amount of training. The bow device is of particular value when used with rods that are attached to spinning reels, since there is a very minimal danger of backlash in this type of reel when the lure is shot out from the bow. The bow device is rugged and relatively inexpensive, and has no complicated parts required for usage or attachment to the rod.

The above features are objects of this invention and further objects will appear in the detailed description which follows and will be otherwise apparent to those skilled in the art.

For the purpose of illustration of this invention, there is shown in the accompanying drawings a preferred embodiment. It is to be understood that the drawings are for the purpose of example only, however, and that the invention is not limited thereto.

In the drawings:

FIGURE 1 is a view in side elevation of the fishing lure bow device attached to a fishing rod;

FIGURE 2 is a top plan view of the device of FIGURE 1;

FIGURE 3 is a view in rear elevation of the bow device taken on line 3—3 of FIGURE 2;

FIGURE 4 is a fragmentary top plan view taken similarly to FIGURE 2 but with the bow partly extended ready to propel the fishing lure;

FIGURE 5 is an enlarged fragmentary view in front elevation of the right end of the bow showing the string attachment means;

FIGURE 6 is an enlarged fragmentary view in front elevation of the left end of the bow showing the string attachment means;

FIGURE 7 is a top plan view of FIGURE 6;

FIGURE 8 is an enlarged fragmentary view in rear elevation of the right end of the bow showing the means for attaching the bow string;

FIGURE 9 is an enlarged fragmentary view of the middle portion of the bow as shown in the view of FIGURE 3 showing the means for clamping the bow on to the shaft of the fishing rod;

FIGURE 10 is a view in section taken on the line 10—10 of FIGURE 9 showing the bow securing means;

FIGURE 11 is a view in section taken on the line 11—11 of FIGURE 9 showing further details of the securing means;

FIGURE 12 is a view in elevation showing the hook element used in the clamp for the bow securing means;

FIGURE 13 is an enlarged view in rear elevation of the fishing lure receiver or grapsing means;

FIGURE 14 is a view in front elevation of the receiver of FIGURE 13; and

FIGURE 15 is a view in enlarged section taken on the line 15—15 of FIGURE 14 showing the construction of the fishing lure receiver.

Referring now to the drawings and FIGURES 1 through, the bow device is generally indicated by the reference numeral 20. As there shown, it is attached to a fishing rod 22, provided with a handle portion 24, a shaft portion 6, having line guides 28. The rod is further provided with a conventional spinning reel 30 having a fishing line 32.

The bow device 20 is formed of a base portion 34 and a pair of diverging arms 36 and 38 connected to the base. The base is further provided with a sleeve portion 40 having a securing means 42 by virtue of which the sleeve is adapted to be firmly attached to the shaft of the fishing rod. Each of the bow arms 36 and 38 have arms that are, when considered in vertical cross-section, generally vertically elongated, such that when they are brought back rearward under tension they flex and provide a high degree of kinetic energy for shooting the lure into space. Each of the upper ends of the arms is provided with a string attachment plate 44 and 46 at the ends of the left arm, and the right arm 36 and 38, respectively. A bow string 48 is threaded through these plates and around notches 50 and 52 in each of the arms to anchor upper and lower flights of the bow strings 54 and 56, respectively. This is best shown in FIGURES 3, 5, 6 and 8.

A grasping means 58 is secured to both the top and the bottom bow strings, which are spaced apart to provide for the reception of the lure 59 in the grasping means. The gasping means, formed of a pair of fairly stiff flexible portions 60 and 62, as shown in FIGURES 14 and 15, are connected by a flexible hinge element 64, so that the grapsing means can be closed about the lure to grasp it.

The securing means 42 for securing the bow device to the shaft of the fishing rod is best shown in FIGURES 9 through 13. As there shown, it comprises a concave sleeve or half shell 40 which mates with the top of the shaft of the fishing rod and a hook or clamp element 66, which is adapted to be drawn tight against the bottom of the shaft. The clamp element 66 is shown in detail in FIGURE 12 and has a top threaded portion which fits through an opening 68 in the sleeve, and is adapted to be drawn tight or secured by a knurled nut 70. The securing device, through the use of the long sleeve 40, provides a firm bearing surface against the force of the bow when the bow string is tensioned and then released in propelling the lure.

USE

The bow device of this invention is very simply adapted to be used with a conventional fishing rod and spinning reel. The spinning reel is of particular value, since backlash is obviated through its employment, although with some degree of experience a regulation or conventional reel of the spool type can be employed. The bow device is of particular value in employment in tight fishing areas that may present only a limited target area that is obscured by overhanging limbs or other obstructions. Literally, the lure can be propelled through a narrow shaft-like opening, which cannot be traversed by a conventional lure that is cast in the normal fashion due to the inherent wide arc employed. However, the relatively flat trajectory obtained through the use of a bow device permits the traverse of such shaft-like openings to the desired target area. Thus, a full degree of control is obtainable.

The bow device is very simply clamped upon the shaft of the fishing rod by securing the clamp element 66 underneath the fishing rod shaft and drawing the knurled nut 70 tight. The rod is then ready for use. This use is accomplished by taking the fishing lure 59, either an artificial plug or even a live minnow, and drawing it back with the fishing line so that the lure is grasped in the grasping means 58. The rod is then held at the butt end by the left hand of the user and the grasping device is pulled backward against the force of the bow arm. This position is best shown in FIGURE 4. The rod device is then aimed in the necessary fashion and the grasping device is released from the hand. The lure is then propelled through the V-shaped opening of the bow arms into the desired target area. The rod is then used in the usual fashion by either permitting the lure to stay in the target area, should live bait be employed, or slowly retrieving in any desired fashion by reeling in upon the fishing reel. Thus, after release, the rod is simply used in the normal and ordinary fashion. In open areas the bow device can be used as previously described, or simply disengaged from the bow device in a matter of seconds, and the rod and reel can then be used in the conventional way. Thus, the bow device is of great utility to be employed as needed.

Various changes and modifications may be made within this invention as will be readily apparent to those skilled in the art. Such changes and modifications are within the scope and teaching of this invention as defined by the claims appended hereto.

What is claimed is:

1. A bow device for propelling a fishing lure for use with fishing rods comprising a pair of upwardly diverging arms supported upon a base, means for attaching said base to the shaft of the fishing rod with said arms extending upwardly from said shaft comprising a sleeve-like means adapted to be clamped to the shaft, a bow string attached to the free ends of said arms, said bow string having two parallel flights of strings spaced from one another and means connected to said two stiring flights for receiving a fishing lure.

2. A fishing rod comprising a shaft, a spinning reel and a bow device, said bow device comprising a pair of upwardly diverging arms supported upon a base, means attaching said base to the fishing rod shaft with said arms extending upwardly from said shaft, a bow string attached to the free ends of said arms and means mounted on said string for receiving a fishing lure.

3. A fishing rod comprising a shaft, a spinning reel and a bow device, said bow device comprising a pair of upwardly diverging arms supported upon a base, means attaching said base to the fishing rod shaft with said arms extending upwardly from said shaft, and a bow string attached to the free ends of said arms, said bow string having two parallel flights of strings spaced from one another and means connected to said two string flights for receiving a fishing lure.

4. A bow device for propelling a fishing lure for use with fishing rods comprising a pair of diverging arms supported upon a base, means for attaching said base to the fishing rod, a bow string attached to the free ends of said arms, said bow string having two parallel flights spaced from one another and means connected to said two string flights for receiving a fishing lure, said lure receiving means comprising a pair of elongated plate-like elements separately attached to the two string flights and having means hingeably connecting them together on a hinge axis fastened between and parallel to said two string flights.

References Cited

UNITED STATES PATENTS

| 1,605,300 | 11/1926 | Thompson | 124—24 |
| 2,823,483 | 2/1958 | Malott | 43—19 |
| 2,948,078 | 8/1960 | Miotke | 43—19 |
| 2,995,129 | 8/1961 | Malott | 124—20 |
| 3,015,182 | 1/1962 | Tuttle et al. | 43—19 |
| 3,129,525 | 4/1964 | Lewis | 43—19 |

SAMUEL KOREN, *Primary Examiner.*

WARNER H. CAMP, *Examiner.*